Nov. 16, 1965     R. E. HUBBARD     3,217,926
MULTIPLE COUNTER AND DISPENSER
Filed March 23, 1964
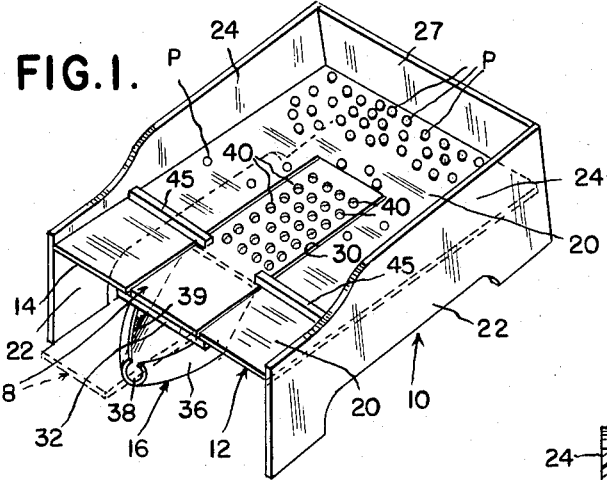
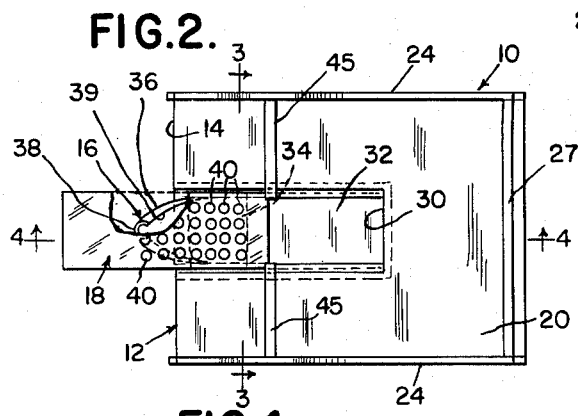
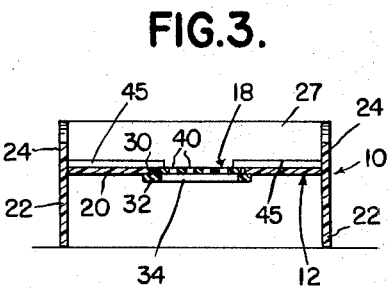
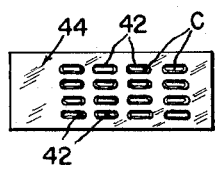
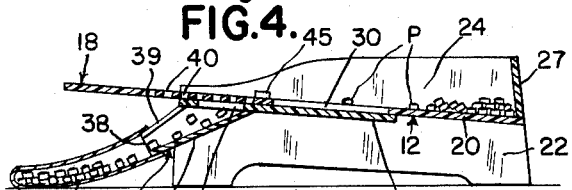
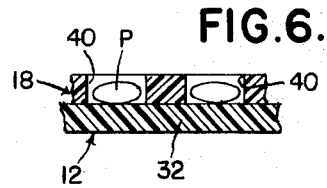
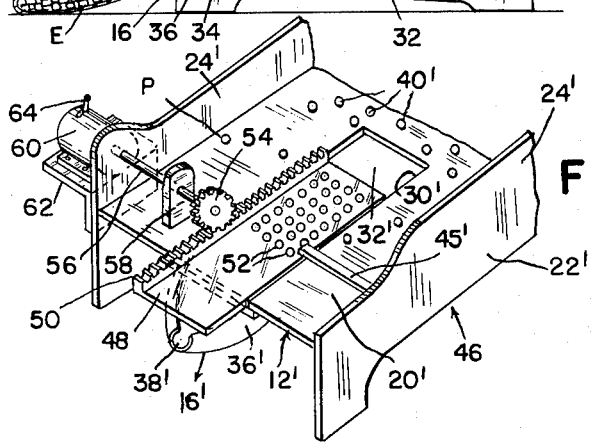
INVENTOR.
RAYMOND E. HUBBARD
BY
ATTORNEYS

United States Patent Office 3,217,926
Patented Nov. 16, 1965

3,217,926
MULTIPLE COUNTER AND DISPENSER
Raymond E. Hubbard, 3317 Mackin Road, Flint, Mich.
Filed Mar. 23, 1964, Ser. No. 353,789
14 Claims. (Cl. 221—264)

The present invention relates to improvements in a counter and dispenser of multiples of objects of uniform size and shape, i.e., a device which will enable the easy assembling and automatic counting of such objects or articles in groups of a given number and the dispensing for packaging or other operation on such multiple units. Though herein illustrated and described in an embodiment for the quick and easy counting and dispensing of solid pharmaceuticals, therapeutic pills or capsules, it will become evident that the counting and dispensing device of the invention is equally well adapted to handle a wide variety of other articles differing very greatly in character, such, for example, as bearing balls, bolts, washers, screws, and a great number of other objects of uniform size and shape.

Generally, it is an object of the invention to provide a counter device for these purposes which is of exceedingly simple and inexpensive construction, consisting essentially of but two relatively movable parts. These are (a) a flat floor structure providing a floor proper inclined mildly downwardly from front to rear, upon which a bulk quantity of the objects to be counted are initially deposited, this floor member being laterally and rearwardly enclosed by confining walls and having a discharge opening therethrough adjacent the forward edge thereof; and (b) a multiple grouping or counting shuttle plate guided for longitudinal movement in a front-to-rear extending recess in the floor member in the zone directly above and behind the discharge opening of the latter, such shuttle plate being formed with a plurality of holes therethrough equal in number to the multiple or group to be counted, and arranged in a desired pattern within the edges of the plate.

Thus, with the shuttle plate initially disposed rearwardly in its guide recess of the floor structure, and above an imperforate area of the latter rearwardly of the discharge opening, an attendant simply sweeps a random number of objects from a pre-deposited rearward bulk thereof onto the shuttle plate, in a manner to slide such objects over the holes of the thus initially disposed shuttle. Using one or two hands for this purpose, all of the holes of the latter are individually filled in a very few passes. Observing this to be the case, the operator then draws the shuttle plate forwardly toward him, causing its holes to pass successively, in transverse rows from front to rear, over the floor discharge opening, whence they gravitate, preferably through a forward dispensing chute or spout beneath the opening, into a suitable bag, envelope, box or other receptacle held beneath the spout.

In further specific accordance with the invention, the top-to-bottom thickness of the grouping and counting shuttle plate is chosen in a way to render it impossible for more than one article or object to be received and retained in any one of its holes during and following the manual sweeping or scraping to charge the holes, as referred to above. Thus, the plate thickness will in any event be substantially less than twice the vertical dimension or diameter of any object handled for counting, and preferably little more, or even a bit less, than such thickness or diameter of the article. In short, the plate thickness need and should be only sufficiently great that, following deposit of an article in a hole, further sweeping motions on the part of the operator will not reasonably be expected to dislodge it from the hole, requiring in consequence that the hole be refilled prior to final discharge of the counted multiple.

Yet another object is to provide a counter of the type described which is inexpensively produced from available sheet or plate, and/or moldable materials, preferably a transparent plastic such as the acrylic resin compound known as Lucite. This enables the device to be readily assembled of pre-molded and/or cut and drilled plate components, as well as to be visually inspected for cleanliness in the case of an adaptation for pill or capsule counting. However, any other suitable materials for the purpose are contemplated, as determined by the nature of the counted objects.

While, as indicated above, the device will ordinarily be operated manually by a single operator or attendant, it is contemplated that it may in other adaptations have incorporated therein suitable automatic or motorized means to effect the back-and-forth movement of the shuttle plate; and this is therefore another specific object of the invention. However, in most cases it will be desirable to provide a device of the simplest and least expensive nature as is practically possible, thus adapting the same for use, as called for only from time to time, in a typical pharmacy, physician's laboratory or the like.

The foregoing as well as other objects will become more apparent as this description proceeds, especially when considered in connection with the accompanying drawing illustrating the invention, wherein:

FIG. 1 is a top perspective view of the improved multiple counter and dispenser, showing its shuttle plate in solid line in a rearwardly retracted position for the initial reception of a charge of objects (as pills) to be counted, and indicating in dotted line the position the shuttle plate occupies at or approaching its forward, discharge position;

FIG. 2 is a top plan view, partially broken away, showing the device with its shuttle plate in the discharge position;

FIGS. 3 and 4 are, respectively, views in transverse and longitudinal vertical section along lines 3—3 and 4—4 of FIG. 2;

FIG. 5 is a plan view of an alternative type of shuttle plate, featuring a different shape and arrangement or pattern of discharge holes, as for the counting and dispensing of elongated pharmaceutical capsules;

FIG. 6 is a fragmentary view in section similar to FIG. 4, showing, in a more actual scale than the reduced scale of FIGS. 1 through 5, the proportions of floor member and the shuttle plate, and its openings, in relation to the objects to be counted; and FIG. 7 is a fragmentary top perspective view generally similar to FIG. 1, but showing in a schematic way a modification of the basic counter of FIG. 1 through 6 to motorize its shuttle plate.

The multiple counter and dispenser of the invention, generally designated 10, basically comprises a floor structure 12 carrying therebeneath and adjacent its forward edge 14 an enclosed and inclined dispensing spout or funnel 16; and a multiple counting shuttle plate, generally designated 18. This plate is carried by the floor structure 12 for reciprocatory movement, under manual actuation, in a direction from adjacent the rear of the floor structure 12 toward and past its forward edge 14. The shuttle plate will be hereinafter described in detail.

As indicated above, the counting device 10 is preferably fabricated in its entirety of a transparent plastic composition, such as the acrylic resin known as Lucite, or any other suitable transparent resin material capable of being formed by cutting or molding in rigid formed or sheet-like parts, then assembled, as by adhesion or fusion, to one another. Such materials lend themselves to quick and inexpensive fabrication and assembly, and also permit ready inspection for cleanliness. However, the specific nature of the material or materials will be determined as circumstances dictate or permit.

As constituted of the general combination referred to above, the floor structure 12 comprises a rectangular floor plate 20, proper, which, as best shown in FIG. 4, inclines mildly downwardly to the rear from the forward edge 14 of this plate and the structure 12, being thereby adapted to receive and temporarily store a bulk charge of quite a large number of the objects or articles to be counted and dispensed, indicated as pills P, in its rear area behind the shuttle plate 18 and in areas to either side of the latter. The floor plate 20 is adapted to be supported on a suitable surface (not shown) by upright side members or plates 22 which are extended substantially above the edges of plate 20 as lateral confining walls 24; and a further rear confining member or wall 27 extends between the walls 24. The side and rear plates are rigidly secured to corresponding margins of floor plate 20, for example by fusion or adhesion, or by any other suitable means not shown.

The floor plate 20 is provided with a rectangular, front-to-rear elongated recess or slot 30 which extends from a point spaced substantially forwardly of the rear confining wall 27, opening through the forward floor edge 14; and in this area, the floor plate 20 is bottomed by a further auxiliary plate 32 of somewhat greater width and length than the rectangular slot 30, the auxiliary plate 32 of floor structure 12 coming forwardly flush with the edge 14. As best indicated in FIG. 4, the bottoming plate 32 is imperforate for a substantial extent from rear to front but is provided with a rectangular discharge opening 34 therethrough, which is spaced a bit rearwardly from its own forward edge, being directly above the discharge spout or funnel 16. The latter is fixedly secured, as by adhesive or fusion, to the bottom of auxiliary floor plate 32, in surrounding relation to the discharge opening 34 of the latter.

Spout 16 may be produced by injection molding (or if desired it may be constituted of a plurality of plate parts secured to one another). As shown in FIGS. 1, 2 and 4, it is enclosed at its sides and bottom by a forwardly and downwardly curved wall structure 36 converging to a dump opening or mouth 38, above which a top clearance or draft slot or throat 39 tends to minimize any tendency to clog. Such spout means directs the objects or pills P through the opening 38, and into an appropriate container, such as a bag or envelope E held by the operator in externally telescoped position about the spout's mouth zone.

The shuttle plate 18 is flat and rectangular in outline, being of the same thickness as main floor plate 20 and of slightly less width than the rectangular recess 30 in the latter above auxiliary floor plate 32, in which recess the plate 18 is slidingly guided. It is preferably fabricated of the same transparent material as floor members 20, 32 and upright members 22, 27, but not necessarily so. Adjacent the rear thereof, plate 18 is provided with a plurality of round object receiving openings or holes 40 extending through the thickness thereof. These are in any desired number or grouping; for example, the embodiment of shuttle plate 18 depicted in FIGS. 1–3 has 28 holes disposed in seven forwardly to rearwardly spaced rows of four holes each. This may be found convenient in counting and dispensing a multiple of round pills P for a prescribed dosage over a given period. Thus, the number mentioned will afford a prescription of four pills daily for a week's time.

However, the arrangement, size and shape of the holes may be varied widely. For example, FIG. 5 of the drawing shows an alternative arrangement of elongated holes 42 in a different, though similarly proportioned shuttle plate 44, for the counting and dispensing of elongated soluble capsules C in multiples of 16 each. It is contemplated that a selection of plates such as 18 and 44 will be provided as change-over equipment of the counter 10 to enable the handling of the usual pharmaceutical pills and capsules. The same considerations as to hole size, shape and arrangement of course govern the selection of shuttle plates used in units 10 for the counting and dispensing of other objects, such as the bearing balls, nuts, etc., mentioned above.

Forward transverse barrier strips 45, fixed on the top of floor plate 20, overhang somewhat the side limits of recess 30 and the shuttle plate 18 therein. Strips 45 act to hold the plate against inadvertent upward tilting in passing the forward floor edge 14. They also forwardly restrain the charge of bulk objects P or C on floor structure 12.

The consideration which governs the selection of the shuttle plate in all instances is that its holes, regardless of size and shape of their peripheral outline, should each be only sufficiently deep to provide adequately stable lateral restraint to maintain a single object therein without displacement under continued sweeping of other objects to complete the loading of the full complement of shuttle plate holes 40 or 42; yet they must not be sufficiently deep to receive and thus restrain more than one object. For example, in no instance should the thickness of the shuttle plate 18 or 44 equal or even closely approximate twice the vertical dimension or diameter of an object P or C to be charged into a plate hole; and preferably this thickness should be not substantially greater than the actual dimension or diameter in question, or even a trifle less, as appears in FIG. 6. In this way, insurance is had that no hole shall receive, and stably restrain in the lateral sense, more than a single object up to the loading of the plate to a full complement of filled holes. At the same time, completion of that operation is considerably expedited, in that no hole must be refilled to replace an object accidentally displaced therefrom.

The operation of the device is believed clear from the foregoing. Once charged from a rear and/or side bulk charge receiving area of main floor plate 20 with a full number of objects P or C in the desired multiple or grouping, the plate 18 or 44 is slidingly drawn forwardly over the discharge area of auxiliary floor plate 32, the rows of respective holes 40 or 42 passing over the discharge opening 34 of that plate, and the objects dropping from the holes through the spout or funnel 16. Before and while performing this operation, the attendant positions a suitable container, such as a bag or envelope E, telescopingly about the spout in the zone of its discharge mouth 38, as shown in FIG. 4, and the objects are thus conveniently and quickly loaded to such container for further disposition.

It may be found desirable in some instances to modify the device 10 for automatic or semi-automatic operation. Thus, as illustrated in FIG. 7, the invention contemplates a motorized counter and dispenser, designated by the reference numeral 46. In general, this device corresponds in its basic parts and relationships to the simpler device 10 of FIG. 1; and, accordingly, corresponding parts are designated by corresponding reference numerals, primed.

As shown in FIG. 7 (which is entirely schematic and simply intended to depict a typical motorized unit 46), the shuttle plate, specially designated 48, is formed along an edge thereof to provide an elongated, upwardly facing, toothed rack 50 coextensive in length with the plate, which plate is further provided with object receiving openings 52 of one type or arrangement or another, in the manner described above.

Rack 50 is meshingly engaged by a small pinion 54 on a transversely extending, horizontal shaft 56, which is appropriately journaled in an upright bearing block 58 fixed on the top of the floor structure 12'. Shaft 56 is further journaled in a side wall 24' of structure 12', and is driven by a small electric motor 60 fixedly mounted by a bracket 62 to wall 24'. Motor 60 is controlled by a suitable toggle switch 64, and may be a reversing motor. Thus, the shuttle plate 48 may be reversibly actuated automatically in its back and forth sliding movements, as guided in the floor structure recess 30'. A single barrier strip 45' suffices.

A motorized unit 46 of this sort may be found suitable for a dispensing laboratory in which a considerable volume of counting and dispensing work exists. However, for ordinary use in a physician's laboratory or in the usual pharmacy, the simpler, manually actuated version of FIG. 1 is entirely suitable. Naturally, appropriate safety protective provisions to shield the motor pinion and plate rack components are contemplated, although not shown in FIG. 7 for the sake of simplicity.

The device is exceedingly simple and readily manipulated, yet accurate and efficient when used by a relatively unskilled person in counting and dispensing multiples or groups of articles of any desired number, and of a wide variety of types.

What I claim as my invention is:

1. A device for counting objects in multiples, comprising a floor structure having a forward discharge area and a bulk charge-receiving area upon which some if not all of the objects are deposited, said floor structure providing an elongated guide recess beneath the upper surface thereof extending forwardly of the structure, said floor recess having a bottom which is imperforate in the rear portion thereof and having a discharge opening of substantial size forwardly of said rear portion to receive a counted multiple of said objects; and a shuttle plate guided for rearward-to-forward sliding movement in said recess, with the upper edge of said shuttle plate approximately flush with that of said floor structure, said shuttle plate having a plurality of spaced holes therethrough which are in perimetral outline similar to but somewhat greater than that of the individual objects, said shuttle plate being of a thickness not substantially greater than the thickness of an object within the perimetral outline of the latter, whereby not to stably maintain laterally in any hole more than one object, said shuttle plate holes when fully loaded discharging a full counted multiple of objects through said floor structure opening upon forward movement of the shuttle plate in said guide recess.

2. A device for counting objects in multiples, comprising a floor structure inclined rearwardly and downwardly between a forward discharge area and a rearward bulk charge-receiving area upon which some if not all of the objects are deposited, said floor structure providing an elongated, straight-walled guide recess beneath the upper surface thereof forwardly of said charge-receiving area and extending forwardly of the structure, said floor recess having a bottom which is imperforate in the rear portion thereof and having a discharge opening of substantial size forwardly of said rear portion to receive a counted multiple of said objects; and a rectangular shuttle plate guided for rearwardly-to-forward sliding movement in said recess on the bottom of the latter, with the upper surface of said shuttle plate approximately flush with that of said floor structure, said shuttle plate having a plurality of spaced holes therethrough which are in perimetral outline similar to but somewhat greater than that of the individual objects, said shuttle plate being of a thickness not substantially greater than the thickness of an object within the perimetral outline of the latter, whereby not to stably maintain laterally in any hole more than one object, said shuttle plate holes when fully loaded discharging a full counted multiple of objects through said floor structure opening upon forward movement of the shuttle plate in said guide recess.

3. A device for counting objects in multiples, comprising a floor structure inclined rearwardly and downwardly between a forward discharge area and a rearward bulk charge-receiving area upon which some if not all of the objects are deposited, said floor structure providing an elongated, straight-walled guide recess beneath the upper surface thereof forwardly of said charge-receiving area and extending forwardly of the structure through the forward edge of the latter, said floor recess having a bottom which is imperforate in the rear portion thereof and having a discharge opening of substantial size forwardly of said rear portion to receive a counted multiple of said objects; and a rectangular shuttle plate guided for rearward-to-forward sliding movement in said recess on the bottom of the latter, with the upper surface of said shuttle plate approximately flush with that of said floor structure, said shuttle plate having a plurality of spaced holes therethrough which are in perimetral outline similar to but somewhat greater than that of the individual objects, said shuttle plate being of a thickness not substantially greater than the thickness of an object within the perimetral outline of the latter, whereby not to stably maintain laterally in any hole more than one object, said shuttle plate holes when fully loaded discharging a full counted multiple of objects through said floor structure opening upon forward movement of the shuttle plate in said guide recess and over said forward edge of the floor structure.

4. A device for counting objects in multiples, comprising a floor structure inclined rearwardly and downwardly between a forward discharge area and a rearward bulk charge-receiving area upon which some if not all of the objects are deposited, said floor structure providing an elongated, straight-walled guide recess beneath the upper surface thereof forwardly of said charge-receiving area and extending forwardly of the structure through the forward edge of the latter, said floor recess having a bottom which is imperforate in the rear portion thereof and having a discharge opening of substantial size forwardly of said rear portion to receive a counted multiple of said objects; and a rectangular shuttle plate guided for rearward-to-forward sliding movement in said recess on the bottom of the latter, with the upper surface of said shuttle plate approximately flush with that of said floor structure, said shuttle plate having a plurality of spaced holes therethrough which are in perimetral outline similar to but somewhat greater than that of the individual objects, said shuttle plate being of a thickness not substantially greater than the thickness of an object within the perimetral outline of the latter, whereby not to stably maintain laterally in any hole more than one object, said shuttle plate holes when fully loaded discharging a full counted multiple of objects through said floor structure opening upon forward movement of the shuttle plate in said guide recess and over said forward edge of the floor structure, said floor structure having a forward spout beneath said opening to receive and discharge the counted multiple.

5. A device for counting objects in multiples, comprising a floor structure having a forward discharge area and a bulk charge-receiving area upon which some if not all of the objects are deposited, said floor structure comprising a main floor plate having an elongated slot of rectangular outline, and an auxiliary floor plate bottoming said slot and coacting therewith in providing an elongated guide recess beneath the upper surface thereof, said auxiliary plate being imperforated in a rear portion thereof beneath said recess and having a discharge opening of substantial size forwardly of said rear portion to receive a counted multiple of said objects; and a shuttle plate guided for rearward-to-forward movement in said recess and directly on said auxiliary floor plate, with the upper surface of said shuttle plate approximately flush with that of said main floor plate, said shuttle plate having a plurality of spaced holes therethrough which are in perimetral outline similar to but somewhat greater than that of the individual objects, and said shuttle plate being of a thickness not substantially greater than the thickness of an object within the perimetral outline of the latter, whereby not to stably maintain laterally in any hole more than one object, said shuttle plate holes when fully loaded discharging a full counted multiple of objects through said opening of said auxiliary floor plate upon forward movement of the shuttle plate in said guide recess.

6. A device for counting objects in multiples, comprising a floor structure inclined rearwardly and downwardly between a forward discharge area and a rearward bulk charge-receiving area upon which some if not all of the objects are deposited, said floor structure comprising a main floor plate having an elongated slot of rectangular outline forwardly of said rearward area of said structure and extending through the forward edge of the plate thereof, and an auxiliary floor plate bottoming said slot and coacting therewith in providing an elongated guide recess beneath the upper surface thereof, said auxiliary plate being imperforate in a rear portion thereof beneath said recess and having a discharge opening of substantial size forwardly of said rear portion to receive a counted multiple of said objects; and a shuttle plate guided for rearward-to-forward movement in said recess and directly on said auxiliary floor plate, with the upper surface of said shuttle plate approximately flush with that of said main floor plate, said shuttle plate having a plurality of spaced holes therethrough which are in perimetral outline similar to but somewhat greater than that of the individual objects, and said shuttle plate being of a thickness not substantially greater than the thickness of an object within the perimetral outline of the latter, whereby not to stably maintain laterally in any hole more than one object, said shuttle plate holes when fully loaded discharging a full counted multiple of objects through said opening of said auxiliary floor plate upon forward movement of the shuttle plate in said guide recess.

7. A device for counting objects in multiples, comprising a floor structure inclined rearwardly and downwardly between a forward discharge area and a rearward bulk charge-receiving area upon which some if not all of the objects are deposited, said floor structure comprising a main floor plate having an elongated slot of rectangular outline forwardly of said rearward area of said structure and extending through the forward edge of the plate thereof, and an auxiliary floor plate bottoming said slot and coacting therewith in providing an elongated guide recess beneath the upper surface thereof, said auxiliary plate being imperforate in a rear portion thereof beneath said recess and having a discharge opening of substantial size forwardly of said rear portion to receive a counted multiple of said objects; and a shuttle plate guided for rearward-to-forward movement in said recess and directly on said auxiliary floor plate, with the upper surface of said shuttle plate approximately flush with that of said main floor plate, said shuttle plate having a plurality of spaced holes therethrough which are in perimetral outline similar to but somewhat greater than that of the individual objects, and said shuttle plate being of a thickness not substantially greater than the thickness of an object within the perimetral outline of the latter, whereby not to stably maintain laterally in any hole more than one object, said shuttle plate holes when fully loaded discharging a full counted multiple of objects through said opening of said auxiliary floor plate upon forward movement of the shuttle plate in said guide recess, said floor structure having a forward spout beneath said auxiliary plate opening thereof to receive and discharge the counted multiple.

8. A device for counting objects in multiples, comprising a floor structure inclined rearwardly and downwardly between a forward discharge area and a rearward bulk charge-receiving area upon which some if not all of the objects are deposited, said floor structure comprising a main floor plate having an elongated slot of rectangular outline forwardly of said rearward area of said structure and extending through the forward edge of the plate thereof, and an auxiliary floor plate bottoming said slot and coacting therewith in providing an elongated guide recess beneath the upper surface thereof, said auxiliary plate being imperforate in a rear portion thereof beneath said recess and having a discharge opening of substantial size forwardly of said rear portion to receive a counted multiple of said objects; and a shuttle plate guided for rearward-to-forward movement in said recess and directly on said auxiliary floor plate, with the upper surface of said shuttle plate approximately flush with that of said main floor plate, said shuttle plate having a plurality of spaced holes therethrough which are in perimetral outline similar to but somewhat greater than that of the individual objects, and said shuttle plate being of a thickness not substantially greater than the thickness of an object within the perimetral outline of the latter, whereby not to stably maintain laterally in any hole more than one object, said shuttle plate holes when fully loaded discharging a full counted multiple of objects through said opening of said auxiliary floor plate upon forward movement of the shuttle plate in said guide recess, and means to power said shuttle plate for movement in said recess.

9. A device for counting objects in multiples, comprising a floor structure having a forward discharge area and a bulk charge-receiving area upon which some if not all of the objects are deposited, said floor structure providing an elongated guide recess beneath the upper surface thereof extending forwardly of the structure, said floor recess having a bottom which is imperforate in the rear portion thereof and having a discharge opening of substantial size forwardly of said rear portion to receive a counted multiple of said objects; and a shuttle plate guided for rearward-to-forward sliding movement in said recess, with the upper surface of said shuttle plate approximately flush with that of said floor structure, said shuttle plate having a plurality of spaced holes therethrough which are in perimetral outline similar to but somewhat greater than that of the individual objects, said shuttle plate being of a thickness not substantially greater than the thickness of an object within the perimetral outline of the latter, whereby not to stably maintain laterally in any hole more than one object, said shuttle plate holes when fully loaded discharging a full counted multiple of objects through said floor structure opening upon forward movement of the shuttle plate in said guide recess; said floor structure being provided with barrier means adjacent the forward portion thereof to laterally inwardly overlap said guide recess and the shuttle plate slidably therein, thus to restrain said shuttle plate against vertical movement in the recess, and to restrain objects in said bulk charge-receiving area.

10. A device for counting objects in multiples, comprising a floor structure inclined rearwardly and downwardly between a forward discharge area and a rearward bulk charge-receiving area upon which some if not all of the objects are deposited, said floor structure comprising a main floor plate having an elongated slot of rectangular outline forwardly of said rearward area of said structure and extending through the forward edge of the plate thereof, and an auxiliary floor plate bottoming said slot and coacting therewith in providing an elongated guide recess, said auxiliary plate being imperforate in a rear portion thereof beneath said recess and having a discharge opening of substantial size forwardly of said rear portion to receive a counted multiple of said objects; and a shuttle plate guided for rearward-to-forward movement in said recess and directly on said auxiliary floor plate, with the upper surface of said shuttle plate approximately flush with that of said main floor plate, said shuttle plate having a plurality of spaced holes therethrough which are in perimetral outline similar to but somewhat greater than that of the individual objects, and said shuttle plate being of a thickness not substantially greater than the thickness of an object within the perimetral outline of the latter, whereby not to stably maintain laterally in any hole more than one object, said shuttle plate holes when fully loaded discharging a full counted multiple of objects through said opening of said auxiliary floor plate upon forward movement of the shuttle plate in said guide recess, said floor structure having a forward spout beneath said auxiliary plate opening thereof to receive and discharge the counted multiple; said floor structure being provided with barrier means adjacent the forward portion thereof to laterally inwardly overlap said guide recess and the shuttle plate slidably therein, thus to restrain said shuttle plate against vertical movement in the recess, and to restrain objects in said bulk charge-receiving area.

11. A device for counting objects in multiples, comprising a substantially flat floor structure having a discharge area and a bulk charge-receiving area upon which some if not all of the objects are deposited, said floor structure providing a guide recess beneath the upper surface thereof, said floor recess having a bottom which is imperforate in a portion thereof and being provided with a discharge opening adjoining said portion to receive a counted multiple of said objects; and a counting plate guided for sliding movement in said recess, with the upper surface of said plate approximately flush with that of said floor structure, said plate having a plurality of spaced holes therethrough to individually receive the individual objects, said counting plate holes when fully loaded discharging a full counted multiple of objects through said floor structure opening upon movement of the plate in said guide recess.

12. A device for counting objects in multiples, comprising a substantially flat floor structure having a discharge area and a bulk charge-receiving area upon which some if not all of the objects are deposited, said floor structure providing an elongated guide recess beneath the upper surface thereof, said floor recess having a bottom which is imperforate in a portion thereof and having a discharge opening adjoining said portion to receive a counted multiple of said objects; and a counting plate guided for rectilinear sliding movement in said recess, which the upper surface of said plate approximately flush with that of said floor structure, said plate having a plurality of spaced holes therethrough to individually receive the individual objects, said counting plate holes when fully loaded discharging a full counted multiple of objects through said floor structure opening upon movement of the plate in said guide recess.

13. A device for counting objects in multiples, comprising a substantially flat floor structure having a discharge area and a bulk charge-receiving area upon which some if not all of the objects are deposited, said floor structure providing a guide recess beneath the upper surface thereof, said floor recess having a bottom which is imperforate in a portion thereof and being provided with a discharge opening adjoining said portion to receive a counted multiple of said objects; and a counting plate guided for sliding movement in said recess, with the upper surface of said plate approximately flush with that of said floor structure, said plate having but a single set of spaced holes therethrough to individually receive the individual objects, said counting plate holes when fully loaded discharging a full counted multiple of objects through said floor structure opening upon movement of the plate in said guide recess.

14. A device for counting objects in multiples, comprising a substantially flat floor structure having a discharge area and a bulk charge-receiving area upon which some if not all of the objects are deposited, said floor structure providing an elongated guide recess beneath the upper surface thereof, said floor recess having a bottom which is imperforate in a portion thereof and having a discharge opening adjoining said portion to receive a counted multiple of said objects; and a counting plate guided for rectilinear sliding movement in said recess, with the upper surface of said plate approximately flush with that of said floor structure, said plate having but a single set of spaced holes therethrough to individually receive the individual objects, said counting plate holes when fully loaded discharging a full counted multiple of objects through said floor structure opening upon movement of the plate in said guide recess.

References Cited by the Examiner
UNITED STATES PATENTS

| | | | |
|---|---|---|---|
| 453,873 | 6/1891 | Upjohn | 221—265 X |
| 789,086 | 5/1905 | Diebel | 221—264 X |
| 1,066,753 | 7/1913 | Rast | 221—264 X |
| 1,179,254 | 4/1916 | White | 221—265 |
| 2,515,594 | 7/1950 | Fischman | 221—265 |

RAPHAEL M. LUPO, *Primary Examiner.*